(12) United States Patent
Liu et al.

(10) Patent No.: US 7,939,899 B1
(45) Date of Patent: May 10, 2011

(54) SOLID STATE ACTUATOR CAPABLE OF PLATING AND PLATING MATERIAL STORAGE

(75) Inventors: Ping Liu, Thousand Oaks, CA (US); Cameron Massey, Hawthorne, CA (US); Leslie Momoda, Los Angeles, CA (US); Geoffrey McKnight, Los Angeles, CA (US); William Barvosa-Carter, Ventura, CA (US); Alan Jacobsen, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 544 days.

(21) Appl. No.: 11/975,589

(22) Filed: Oct. 20, 2007

Related U.S. Application Data

(62) Division of application No. 10/927,965, filed on Aug. 28, 2004, now Pat. No. 7,298,017.

(51) Int. Cl.
*H01L 29/84* (2006.01)
*H01L 27/14* (2006.01)

(52) U.S. Cl. .................. 257/415; 257/420; 257/428

(58) Field of Classification Search .................. 257/415, 257/422, 428, E29.325, 420
See application file for complete search history.

(56) References Cited

U.S. PATENT DOCUMENTS

2008/0257718 A1* 10/2008 Chiang et al. ................. 204/242

OTHER PUBLICATIONS

Baughman, R.H., "Conducting polymer artificial muscles" Synthetic Metals 78, pp. 339-353 (1996).
Beaulieu, L.Y., Eberman, K.W., Turner, R.L., Krause, L.J., and J.R. Dahn, "Colossal Reversible Volume Changes in Lithium Alloys", Electrochemical and Solid-State Letters, 4, (9) A137-A140 (2001).
Besenhard, J.O., Yang, J., and Winter, M., "Will advanced lithium-alloy anodes have a chance in lithium-ion batteries?", Journal of Power Sources 68, (1997) 87-90.
Lee, S.J., Lee, H.Y., Jeong, S.H., Baik, H.K., and Lee, S.M., 2002, "Performance of tin-containing thin-film anodes for rechargeable thin-film batteries", Journal of Power Sources 111, (2002) 345-349.
Spinks, G.M.,Zhou, D., Liu, L., and Wallace, G.G., 2003, "The amounts per cycle of polypyrrole electromechanical actuators", Smart Materials and Strutures 12, (2003) pp. 468-472.
Winter, M. and Besendard, J.O., "Electrohemical lithiation of tin and tin-based intermetallics and composites", Electrochimica Acta (1999) 45, pp. 31-50.

* cited by examiner

*Primary Examiner* — Hung Vu
(74) *Attorney, Agent, or Firm* — Christopher R. Balzan

(57) ABSTRACT

In one embodiment, a solid state actuator is provided which includes a pair of electrodes and a solid state storage material having a plating material. A solid state ion transport material is adjacent the solid state storage material such that the solid state storage material is located between an anode of the pair of electrodes and the solid state ion transport material. The pair of electrodes are connected so as to be capable of providing an actuation voltage across the solid state storage material to provide transport of plating material cations through the solid state ion transport material between the solid state storage material and a cathode electrode of the pair of electrodes.

15 Claims, 3 Drawing Sheets

SOLID STATE ACTUATOR CAPABLE OF PLATING AND PLATING MATERIAL STORAGE

CROSS REFERENCE TO RELATED APPLICATION

The following application is a divisional of U.S. patent application Ser. No. 10/927,965, filed Aug. 28, 2004 now U.S. Pat. No. 7,298,017, by Liu et al., entitled ACTUATION USING LITHIUM/METAL ALLOYS AND ACTUATOR DEVICE, herein incorporated by reference in its entirety.

BACKGROUND

Solid state actuators are expected to be useful in the aerospace, and space industries, as well as in certain next generation armed forces concepts.

While ferroelectric, ferromagnetic, and twinning based actuators permit relatively high energy density, each of these actuators shares a critical weakness when considering large deformation. Each of these mechanisms are essentially volume conserving and occur at constant density, limiting deformation to local shifts in crystal structure and therefore relatively small overall deformation.

Electroactive polymers including, conducting polymers and ionic based actuation such as Ionic-Polymer-Metal-Composite or IPMC, exploit a reversible electrochemical reaction to perform mechanical work. One disadvantage of these systems, however, is that they have limited stress output. Although conducting polymers yield relatively large strain (~1-5%), it is at low blocking stress. Macro scale conducting polymer actuators typically have stress output on the order of 1-6 MPa, and bulk energy density of 10-80 kJ/m$^3$.

Another disadvantage is that they require a liquid or a gel electrolyte. Both the polymeric nature of these materials and the liquid electrolyte limit their applicability to a narrow temperature range. This limits the applicability of these materials to many environments commonly encountered in structural applications.

SUMMARY

In some embodiments, a solid state actuator is provided which includes a pair of electrodes and a solid state storage material having a plating material. A solid state ion transport material is adjacent the solid state storage material such that the solid state storage material is located between an anode of the pair of electrodes and the solid state ion transport material. The pair of electrodes are connected so as to be capable of providing an actuation voltage across the solid state storage material to provide transport of plating material cations through the solid state ion transport material between the solid state storage material and a cathode electrode of the pair of electrodes.

In some embodiments, a solid state actuator is provided including a pair of electrodes a solid state storage material having a plating material. A solid state ion transport material is adjacent the solid state storage material such that the solid state storage material is located between an anode of the pair of electrodes and the solid state ion transport material. A plating layer is between the solid state storage material and the pair of electrodes. The pair of electrodes are connected so as to be capable of providing an actuation voltage across the solid state storage material, with the plating material being such that a change in volume of the solid state storage material upon removal of the plating material therefrom is less than a change in volume of a plating layer deposited between the pair of electrodes so as to provide displacement for the solid state actuator.

In some embodiments, a solid state actuator is provided which includes a pair of electrodes and a solid state storage material comprising a plating material. A solid state ion transport material is adjacent the solid state storage material such that the solid state storage material is located between an anode of the pair of electrodes and the solid state ion transport material. A plating layer is between the solid state storage material and the pair of electrodes. The pair of electrodes being connected so as to be capable of providing an actuation voltage across the solid state storage material, with the plating material being such that a change in volume of the solid state storage material upon removal of the plating material therefrom is less than a change in volume of a plating layer deposited between the pair of electrodes so as to provide displacement for the solid state actuator.

In various embodiments, the plating layer may be formed adjacent a cathode electrode of the pair of electrodes.

Additional and further embodiments are also provided.

DESCRIPTION

Solid State Lithium Ion Actuator

FIG. 1

Figure 1:
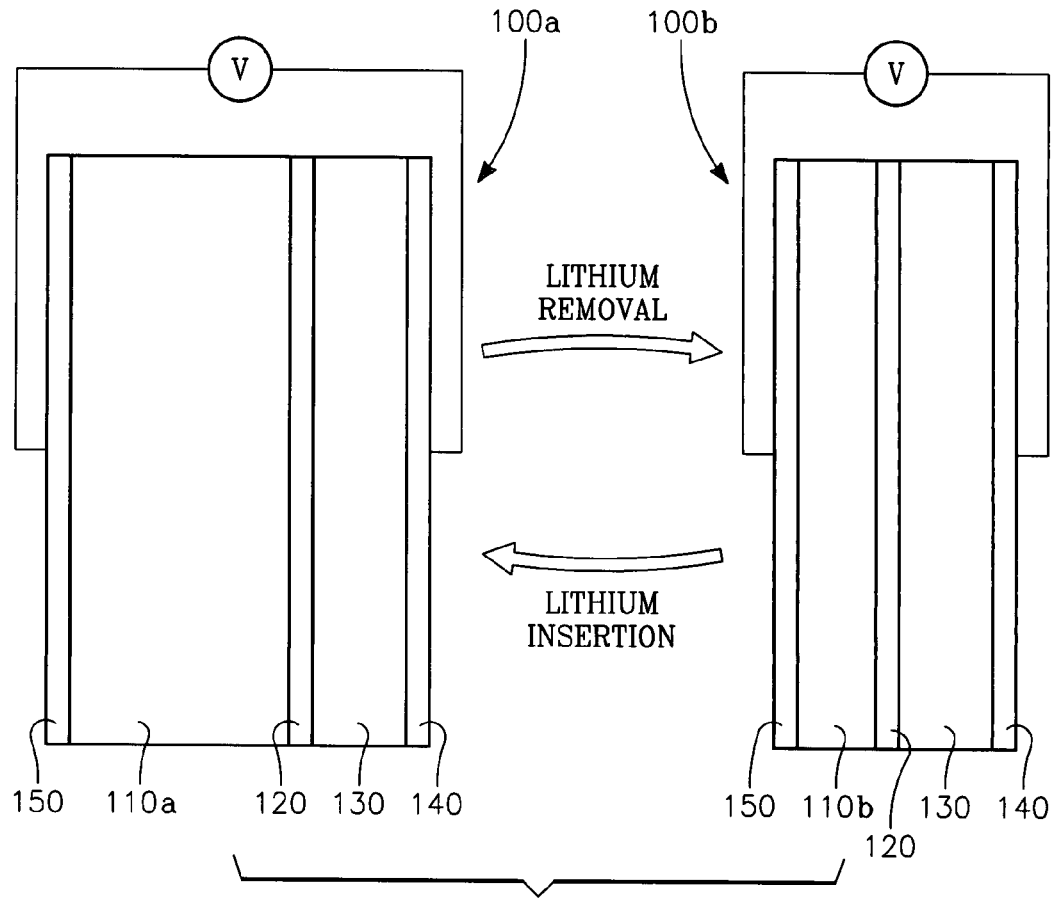
FIG. 1 is a cut-away side view illustration of a solid state actuation process in accordance with the present invention.

FIG. 1 is a cut-away side view illustration of an actuation process utilizing lithiation of metals in an entirely solid state mechanical actuator 100. Actuation occurs via a reversible process of lithium insertion and removal of lithium ions from a volume changing material 110. Once removed from a lithium expanded material 110a, they are stored in a lithium storage material 130. To maximize actuation distance, the lithium storage material 130 typically is volume conserving, or does not change volume to a significant degree as compared to the volume changing material 110. A lithium ion transport material 120 is located between the volume changing material 110 and the lithium storage material 130. In some embodiments, the combined materials provide an actuator capable of large strain and stress.

A voltage potential V, applied across the actuator via electrodes 140 and 150, controls ion transport. The volume changing material 110 forms the anode of the actuator. The lithium ion transport material 120 is an electrolyte which is a lithium ion conductor and electron insulator. The lithium storage material 130 forms the cathode.

For the lithium ion transport material 120, a material which does not also transport electrons may be used. Although typical electrolytes such as soft polymers including salt dissolved in polymer, dry polymer electrolyte, or polymer gel may provide adequate lithium ion transport, for actuation at high temperature and rugged environments, a solid lithium ion conductor material is preferred. Solid state lithium ion transport materials have a mechanical performance that allows large mechanical loads to be supported.

One potential drawback with some solid lithium ion conductor materials is that they can suffer from poor electrochemical stability above a threshold, i.e. in a window of over 4 V. If this is the case, the cathode-anode pairs can be selected so that the device may be operated at voltages within a range that is below the stability threshold for the selected transport material. By appropriately selecting the operating range, additional types of solid lithium ion conductors may be utilized with improved stability.

In one possible embodiment, the solid lithium ion conductor may be a super ionic conductor such as lithium sulfide, for example $Li_{4-x}Ge_{1-x}P_xS_4$ (0.4<x<0.8). It is a high stiffness material that exhibits acceptable lithium ion transport at room temperature, and excellent transport at elevated temperatures as low as 100°. In the above example the phosphate can be replaced with nitrogen or the like, and/or the germanium may be replaced with silicon or the like.

High stiffness lithium ion conductor materials are well suited for use in actuators. High stiffness materials include ceramics and other crystal lattice material, as well as some strong amorphous materials. Some amorphous materials, such as vacuum deposited amorphous materials, are high stiffness as they have sufficient strength to support actuation. Typically high stiffness materials exhibit stress output of about 50 Gpa or more. Most inorganic lithium ion conductors are high stiffness. Many high stiffness ion conductors are possible, for example: super ionic conductors, such as, lithium sulfide, LiSICON, Thio-LiSICON; doped lithium materials such as nitrogen doped lithium phosphate or Li—N—P—O, zirconium doped lithium silicate or Li—Si—Zr—O, Li—B—O, Li—B—O—I, Li—Si—P—O, Li—Nb—P—O, Li—B—S, Li—La—Ti—O, Li—Ti—Al—P—O, Li—Si—Al—O, etc.; or other materials known in the lithium ion battery field.

It is significant to note that in an actuator, ion conductor material which allows leakage current is acceptable in certain embodiments, as charge conservation is not always paramount in actuator implementations. For example, Thio-LiSICON contains sulfur which can allow charge leakage. Nevertheless, it may be utilized in certain actuator embodiments due to its strong material properties.

The lithium storage material 130 preferably is formed of a material that does not show large changes in volume. The lithium storage material 130 may be formed of: carbonaceous materials such as graphite; transition metal oxides such as lithium titanium oxide, lithium manganese oxide, lithium cobalt oxide, lithium nickel oxide, etc.; lithium metal phosphates such as lithium iron phosphate, lithium vanadium phosphate, lithium manganese phosphate, lithium cobalt phosphate, etc.; or other materials known in the lithium ion battery field.

In one embodiment, the lithium storage material may be composed of graphite, which can store large amounts of lithium while exhibiting only small expansion/contraction. In one embodiment, the lithium storage material 130 is composed of lithium titanium oxide, such as $Li_{4+x}Ti_5O_{12}$, where x is 0-3. Lithium titanate is a ceramic material, with high stiffness, which can store large amounts of lithium, and also does not significantly change in volume. Other types of lithium containing compounds which can reversibly accept and release lithium without experiencing significant volume change during the process are possible. Moreover, the lithium storage material may include solid inorganic compounds that have polymer lithium conducting mediums or additives.

Volume changing material 110 opposing the lithium storage material 130 across the ion transport material 120. The volume changing material 110 is primarily responsible for the actuation distance of the actuator 100.

In some actuator embodiments, it is desirable to have a robust volume changing material 110, one that is capable of reliably providing large actuation distances while supporting high stress and strain. Of particular concern in actuators, is that the large expansion of the volume changing material 110, combined with the applied stress and strain of the actuator, could lead to mechanical failure (i.e. crumbling) of the volume changing material 110. Another concern is that charge capacity (and volume expansion) could decrease precipitously during only a few cycles for pure volume changing materials, such as Sn. Several techniques may be utilized to provide more repeatable lithium insertion/removal in actuators. In some implementations of the present invention, improved repeatability may be achieved by alloying the lithium accepting materials with other non-active materials, by controlling the applied voltage closely so that transition occurs only between two more closely related compounds, and/or by changing the size scale of the lithium accepting metal.

In actuator embodiments which require repeated cycles of lithium insertion and removal under high stress and strain, alloys may be utilized to provide improved repeatability of the volume changing material 110. Various alloyed metals, for example alloys of Sn, Sb, and Ag, yield a volume changing material 110 that will exhibit more repeatable cycles than the pure elements. Sn alloys in particular, such as for example SnSb, provide highly repeatable reactions with lithium, and allow control of strain output by varying the molar fraction of each component. Other alloys are possible, such as alloys of Al, Si, Mg, Fe, Ti, Cu, Ni, or the like.

Improved repeatability of the volume changing material 110 also may be obtained by mechanically mixing fine powders of lithium acceptor alloys. Encapsulation of an active lithium accepting metal by a non-active metal may help accommodate the volume expansion while maintaining electrical contact. In an alternate embodiment, a volume changing material 110 which includes several oxides containing lithium reactive metals are combined to make a glassy material that is further processed to create bound powder. Each of these implementations utilizes a composite material with randomly distributed active components in a lithium conducting medium. As discussed further below, heterogeneous mixtures may be utilized in certain embodiments to provide anisotropic expansion of the volume changing material.

In some implementations, careful control of the applied voltage limits may be utilized to provide more repeatable dimensional changes. Because the lithiation of metal species is tremendously sensitive to applied voltage, controlling the lithiation of volume changing material limits the reaction to compounds of more compatible dimensions. By selecting the appropriate actuation voltage limits, control of species formation may be obtained to improve the cyclic stability of the device. The voltage source may have associated therewith, a processor or equivalent hardware and/or software means, to control the actuation voltage within an operating range below a stability threshold voltage for the solid state lithium ion transport material so as to inhibit mechanical failure of the solid state lithium ion transport material.

The cyclical stability gain achieved by limiting the voltage range may result from inhibiting of the formation of highly strain incompatible Li compounds that cause excessive fracture and localized failure. This is possible in some actuator embodiments because the voltage and the charge density typically are not primary concerns in most embodiments of the actuator. Instead, the cyclical stability of the dimensional change and blocking stress is of greater concern. So, limiting the voltage range to improve stability is possible in certain implementations.

In some embodiments, the volume changing material 110 is made of active particles. Minimizing the size of the particles from 50 microns to 1 micron improves the cyclic stability, reducing the rate of fractures. Alloys and mixtures of solid thin film volume changing materials is also possible. At smaller geometries it is likely that improved cyclical stability is a result of a decrease in the defect density at smaller scale, a reduction in diffusion length and corresponding reduction in strain gradient, and/or a difference in the absolute expansion dimension.

As such, the insertion/removal reaction, for example between of Sn and Li, can be controlled and modified by changing the size of the components, varying the architecture of the alloy, and employing heterogeneous mixture concepts, as well as by controlling of the applied voltage to determine which species are principally formed during the reaction. These techniques may be utilized so as to tailor the reaction to enhance the performance of the material for actuator applications.

Additional Actuator Embodiments

FIGS. 2-6

The process of lithiation of metals causes isotropic volume expansion. In some implementations, however, it is desirable to have the movement of the actuator provided mainly in a direction of work, and limited in other (lateral) directions.

Figure 2:
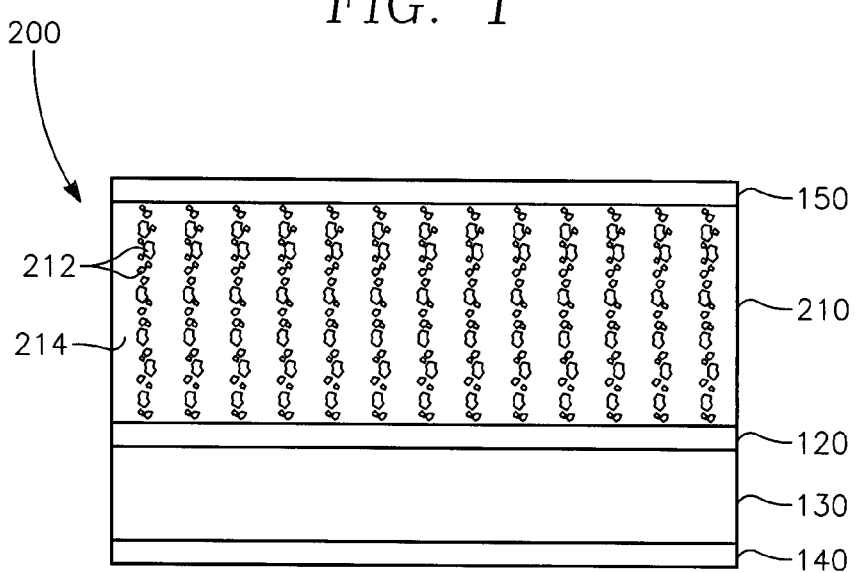
FIG. 2 shows a cut-away side view of an actuator embodiment in accordance with the present invention.

FIG. 2 shows a cut-away side view of an alternate actuator embodiment in accordance with the present invention. In certain embodiments, the volume changing material 210 may include an active component 212 embedded in a matrix 214. In the embodiment shown, the active component 212 is comprised of particles which are aligned generally along vectors extending in the direction of work for the actuator 200. The active component particles 212 may be aligned electrostatically or magnetically. The active particles 212 change their volume in response to the reversible process of lithium insertion and removal of lithium ions from the active particles 212.

The matrix 214 may be a non-active matrix composed of a compliant material which allows transport of lithium ions to the active particles 212. In some embodiments, the non-active matrix 214 may be a composition, such as for example poly ethylene oxide and lithium salt.

The active component particles 212 are aligned along vectors so that when the particles expand they cause expansion of the actuator mainly in the direction of work. Alignment of the active component particles 212 creates a different mechanical connectivity in the alignment direction, than in orthogonal directions. If each active component particle expands isotropically, the composite material 210 expansion will be greater in the direction of the alignment as the stress fields associated with this expansion will add constructively. In orthogonal directions, the stress fields of separate particles do not interact, and the cumulative expansion is reduced. Therefore this arrangement of active component particles 212 and matrix material 214 produces anisotropic expansion.

As there is substantially more expansion along a vector in the direction of work, the expansion of the particles 212 along a vector sums to provide volume expansion in the direction of the vector. Thus, the volume expanding material composite 210 provides motion mainly in the direction of work, while lateral motion may be significantly reduced.

The active component particles 212 may be regular, or irregular. The particles 212 may be elongated particles, such as fibers, rods, tubes, blocks, ribbons, or the like. The elongated particles may be arranged in a stacked configuration in the non-active matrix so that they are aligned along the direction of work. With elongated particles, there is a greater distance of expansion along their length, so the expansion distance of the volume expanding material composite 210 in the elongated direction (along in the direction of work) is greater. Thus, although the active material particles 212 expand and contract isotropically, the non-active matrix moves mainly in the direction of work.

Similar to above, a voltage potential V (not shown in FIG. 2) connected across the actuator 200 via electrodes 140 and 150 controls ion transport between the lithium storage material 130 and the volume expanding material 210, through the lithium ion transport material 120. The volume expanding material 210 expands in response to lithiation of the active component particles 212.

Figure 3:
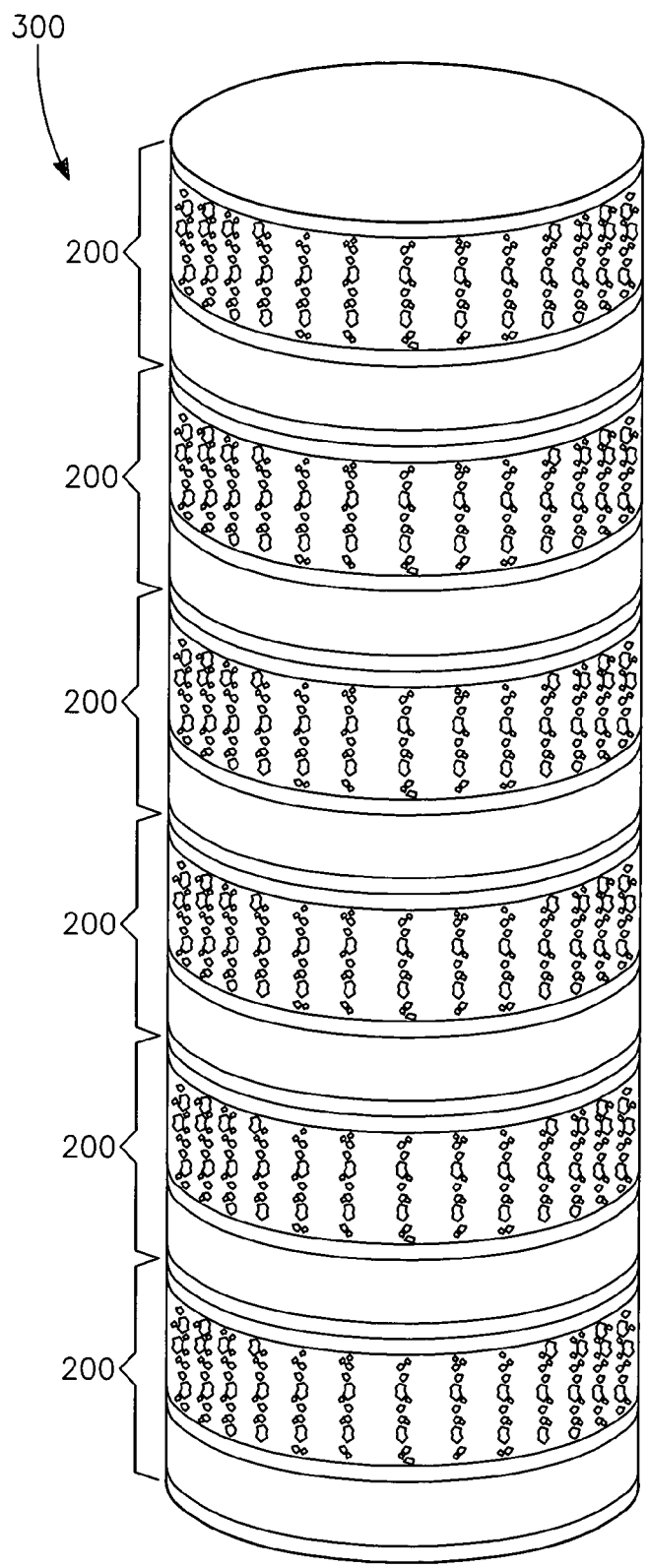
FIG. 3 shows a cross-sectional view of an actuator embodiment having an stacked configuration in accordance with the present invention.

FIG. 3 shows a cross-sectional view of an actuator embodiment 300 having an stacked configuration. The speed of an actuator is controlled in part by the distance that the lithium ions travel through the actuator. To increase actuation displacement without impacting actuator speed, multiple actuators 200, may be stacked to cumulate the actuation distance. With the stacked arrangement, since the distance that the lithium ions travel within their respective actuator 200 does not change, the actuation time does not increase.

Figure 4:
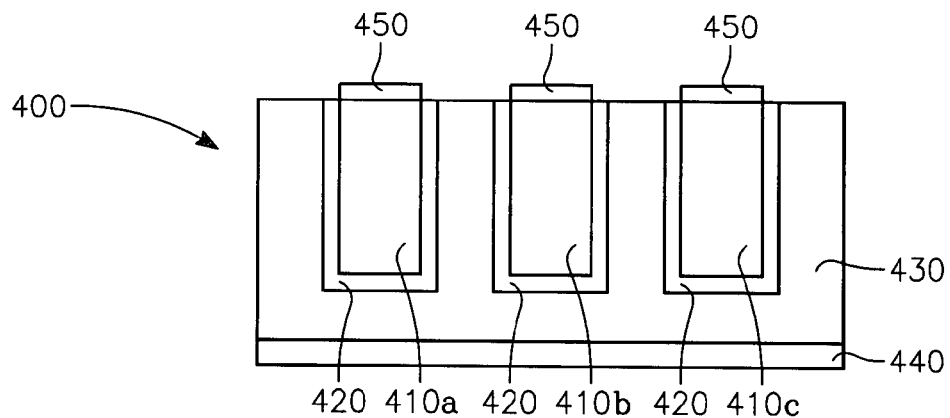
FIG. 4 shows a cross-sectional view of an actuator embodiment having an interdigitated configuration in accordance with the present invention.

FIG. 4 shows a cross-sectional view of an actuator embodiment 400 having an interdigitated configuration. The mechanical properties of the actuator 400 may be enhanced by configuring the actuator 400 in an interdigitated arrangement. In this embodiment, portions of volume expanding material 410a, 410b, and 410c are recessed within the lithium storage material 430. The lithium ion transport material 420 is located between the lithium storage material 430 and the portions of volume expanding material 410a, 410b and 410c. A voltage potential is applied across the actuator 400 via electrodes 440 and 450. The portions of volume expanding material 410a, 410b, and 410c are surrounded on at least three sides by the lithium storage material 430. As such, the portions of volume expanding material 410a, 410b, and 410c will expand to extend out of the lithium storage material 430.

It is also significant to note that recessing the volume expanding material 410 within the lithium storage material 430 increases the amount of lithium storage material 430 opposing the volume expanding material 410. This facilitates ion diffusion. In some embodiments, this configuration can reduce ion diffusion lengths to increase actuation speed.

Figure 5:
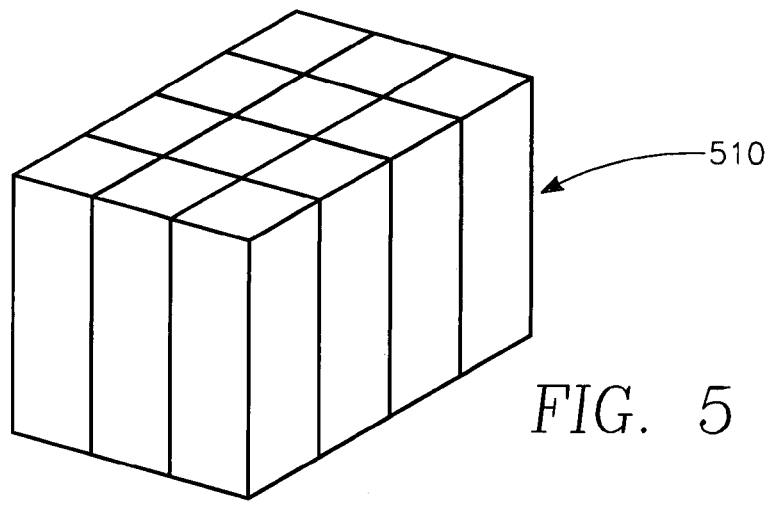
FIG. 5 shows an orthographic illustration of a diced block actuator to form separate elongated actuator structures.
Figure 6:
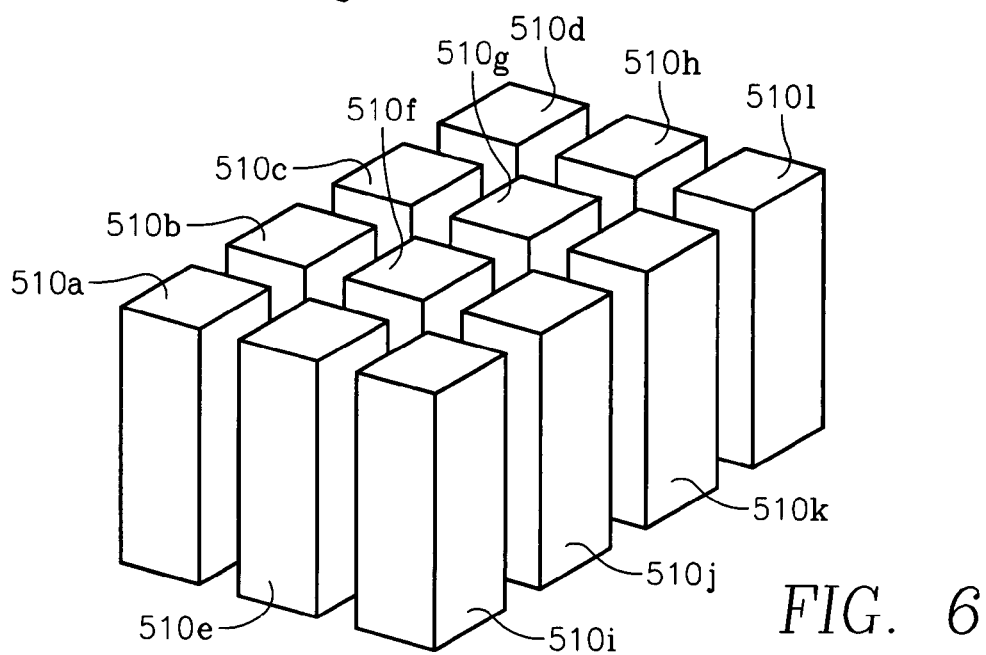
FIG. 6 shows an orthographic illustration of the diced block actuator of FIG. 5 with the elongated structures separated.

FIG. 5 shows an orthographic view of a block actuator 510. The block actuator may be machined, or diced, or otherwise subdivided to form elongated structures 510a-510l, as shown in FIG. 6. The elongated structures 510a-510l may be blocks, rods, posts, pillars, or other elongated solid. As shown in FIG. 6, the elongated structures 510a-510lb may be arranged in a pillared configuration, separated so that their lateral expansion does not cumulate, or does not transfer laterally. Compliant material may be added to fill the gaps between the elongated structures 510a-510l to "absorb" the lateral expansion of the volume expanding material of the elongated structures 510a-510l.

In some embodiments, it is not necessary that the elongated structures 510a-510l be totally isolated structures to limit the lateral expansion by the volume changing material of the elongated structures 510a-510l. Forming channels in the volume changing material of the block 510, or segmenting the volume changing material of the block 510, may be utilized to limit lateral expansion. Thus, in some embodiments the pillared configuration extends only through volume changing material.

An important advantage of electrochemical actuation is that charge transfer controls strain generation, and therefore, actuation is controlled by the applied voltage rather than the applied field. The voltage necessary to drive the reaction depends only on the relative potential of the electrodes, and thus can be limited to a few volts through careful selection of electrode materials. Typically they have relatively large induced deformation, relatively light weight, and scalability down to small geometries.

Metals such as tin, antimony, and aluminum absorb large fractions of lithium ions resulting in a huge volume expansion of 10-300% or more. In addition, lithium based electrochemical actuators have other advantages as compared to polymer based electrochemical systems. These solid state devices do not require a liquid electrolyte, and furthermore, due to enhancement of diffusion at higher temperature, actually exhibit increased power density at elevated temperatures. As such, some embodiments may provide increased energy density, as well orders of magnitude larger strain deformation than achievable with current comparable materials.

In certain embodiments, high stiffness components may support large force output in the megapascal range. These properties combined, may elevate Li-Metal actuation to energy densities equal to or greater than the largest conventional materials, such as NiTi shape memory alloys which have >1 MJ/kg energy density. An additional quality further separates these lithium based actuation from currently available solid state actuators.

As opposed to other actuator means, the lithium removal/insertion process is a reversible chemical reaction where volume is not conserved. The total overall volume of the actuator changes. Furthermore, other actuator means may be limited to relatively low operating temperatures due to both the polymeric nature of the materials, and the necessary liquid or gel electrolyte. Unlike conducting polymers, which can experience a loss in polymer stiffness at higher temperatures, several embodiments of the metallic based lithium storage/removal actuators maintain stiffness even at higher temperatures. Moreover, in some embodiments, ionic diffusion is enhanced at higher temperatures, which leads to higher speed actuation. These properties combined may enable many active structural applications previously not considered due to the demands on actuator material, both in terms of mechanical output and environmental conditions. As such, certain embodiments may deliver both large strain output and relatively large stress output, even when operated in harsh environments. Hence, some embodiments allow significantly higher working temperatures. Embodiments composed entirely of metals and ceramics, could flourish at temperatures from 150-300 degrees Celsius, or potentially up to 800 degrees Celsius, where others are much less effective.

Certain embodiments of the present invention are not limited to lithium storage and lithium storage mechanisms, but are applicable to the storage of other materials that produce a net change in volume. For example, sodium storage material, such as sodium tin, may be utilized in some embodiments. Other materials are possible. In general, some embodiments may utilize any combination of materials, where the combination provides a net change in volume. Referring to FIG. 1, the storage material 130 provides the cations for transporting through the ion transport material 120 between the storage material 130 and the cathode electrode 150. Appropriate storage materials capable of releasing cations are selected so that the change in volume of the storage material 130 is less than the change in volume of the volume changing material 110, so as to create a net displacement for the actuator 100.

In yet other embodiments, the volume changing material as described above may be omitted. In such embodiments, the actuator displacement is achieved by plating of material on the electrode 150. For example in FIG. 1, the layer 110a would be a plated material layer. The layer 110b could be completely removed, if desired, as the plated material is not alloying with a volume changing material, but instead is creating displacement in an actuator by deposition on, and removal from, the surface of the electrode 150. To provide actuation displacement, however, the layer 110b need not be completely removed, but instead may be a reduced, a partial, or even a residual layer as compared to a more plated layer 110a. As such, surface deposition and removal of the plating material 110a creates the actuator displacement.

The plating material 110a may be, for example lithium, copper, silver, sodium, potassium, magnesium, or other conductive material. In such embodiments, the storage material 130 provides plating material cations for transporting through the ion transport material 120 between the storage material 130 and the cathode electrode 150. The storage material 130 releases plating cations. The change in volume of the storage material 130 is less than the change in volume of the plating material layer 110a to provide displacement for the actuator 100. Possible materials for the lithium storage material 130 are discussed above. Other example solid state storage materials are $MV_2O_5$, where M is Na, Ag, Mg, K, Cu, etc. Thus, surface plating and removal of cations at the cathode electrode is primarily responsible for the actuation distance of the actuator 100 in such an embodiment.

Having described this invention in connection with a number of embodiments, modification will now certainly suggest itself to those skilled in the art. As such, the invention is not to be limited to the disclosed embodiments except as required by the appended claims.

What is claimed is:
1. A solid state actuator comprising:
   a) a pair of electrodes;
   b) a solid state storage material comprising a plating material;
   c) a solid state ion transport material adjacent the solid state storage material such that the solid state storage material is located between an anode of the pair of electrodes and the solid state ion transport material; and
   d) the pair of electrodes being connected so as to be capable of providing an actuation voltage across the solid state storage material to provide transport of plating material cations through the solid state ion transport material between the solid state storage material and a cathode electrode of the pair of electrodes.
2. The solid state actuator of claim 1 further comprising a plating layer adjacent the cathode electrode.
3. The solid state actuator of claim 2, wherein the plating layer comprises at least one of lithium, copper, silver, sodium, potassium, or magnesium.

4. The solid state actuator of claim 2, wherein the solid state storage material comprises at least one of a lithium storage material or $MV_2O_5$, where M comprises at least one of Na, Ag, Mg, K or Cu.

5. The solid state actuator of claim 2, wherein the plating material is a material that is non-alloying with the cathode electrode.

6. A solid state actuator comprising:
a) a pair of electrodes;
b) a solid state storage material comprising a plating material;
c) a solid state ion transport material adjacent the solid state storage material such that the solid state storage material is located between an anode of the pair of electrodes and the solid state ion transport material; and
d) the pair of electrodes being connected so as to be capable of providing an actuation voltage across the solid state storage material; and
e) a plating layer formed from the plating material upon application of an actuation voltage across the pair of electrodes such that deposition of and removal of the plating layer causes actuator displacement.

7. The solid state actuator of claim 6 wherein the plating layer is adjacent a cathode electrode of the pair of electrodes.

8. The solid state actuator of claim 7, wherein the plating layer comprises at least one of lithium, copper, silver, sodium, potassium, or magnesium.

9. The solid state actuator of claim 7, wherein the solid state storage material comprises at least one of a lithium storage material or $MV_2O_5$, where M comprises at least one of Na, Ag, Mg, K or Cu.

10. The solid state actuator of claim 7, wherein the plating material is a material that is non-alloying with the cathode electrode.

11. A solid state actuator comprising:
a) a pair of electrodes;
b) a solid state storage material comprising a plating material;
c) a solid state ion transport material adjacent the solid state storage material such that the solid state storage material is located between an anode of the pair of electrodes and the solid state ion transport material;
d) a plating layer between the solid state storage material and the pair of electrodes;
e) the pair of electrodes being connected so as to be capable of providing an actuation voltage across the solid state storage material; and
f) the plating material being such that a change in volume of the solid state storage material upon removal of the plating material therefrom is less than a change in volume of a plating layer deposited between the pair of electrodes so as to provide displacement for the solid state actuator.

12. The solid state actuator of claim 11, wherein the plating layer is adjacent a cathode electrode of the pair of electrodes.

13. The solid state actuator of claim 12, wherein the plating layer comprises at least one of lithium, copper, silver, sodium, potassium, or magnesium.

14. The solid state actuator of claim 12, wherein the solid state storage material comprises at least one of a lithium storage material or $MV_2O_5$, where M comprises at least one of Na, Ag, Mg, K or Cu.

15. The solid state actuator of claim 12, wherein the plating material is a material that is non-alloying with the cathode electrode.

\* \* \* \* \*